United States Patent
Tvetene et al.

(10) Patent No.: US 6,783,318 B2
(45) Date of Patent: Aug. 31, 2004

(54) SOD STACKER

(76) Inventors: Theodore Tvetene, 3801 Grand Ave., Billings, MT (US) 59102; Donald Tvetene, 6844 S. Frontage Rd., Billings, MT (US) 59101; Michael Tvetene, 12 Willow Bend Dr. South, Billings, MT (US) 59102; Gregg Tvetene, 6844 S. Frontage Rd., Billings, MT (US) 59101

( * ) Notice: Subject to any disclaimer, the term of this patent is extended or adjusted under 35 U.S.C. 154(b) by 106 days.

(21) Appl. No.: 10/226,365

(22) Filed: Aug. 22, 2002

(65) Prior Publication Data

US 2004/0037683 A1 Feb. 26, 2004

(51) Int. Cl.[7] ................................. B65G 57/00
(52) U.S. Cl. ................... 414/789.7; 414/791.7; 414/502; 172/20
(58) Field of Search ................... 414/501, 502, 414/111, 791.5, 791.6, 791.7, 792, 789.7; 172/19, 20, 33

(56) References Cited

U.S. PATENT DOCUMENTS

| | | | |
|---|---|---|---|
| 3,698,534 A | 10/1972 | Hadfield | 198/9 |
| 3,887,013 A | 6/1975 | Helberg | 172/20 |
| 4,294,316 A * | 10/1981 | Hedley et al. | 172/20 |
| 4,966,239 A * | 10/1990 | Hutchison | 172/20 |
| 5,217,078 A | 6/1993 | Zinn | 172/19 |
| 5,230,602 A * | 7/1993 | Schouten | 414/789.7 |
| 5,269,379 A * | 12/1993 | Millar et al. | 172/19 |
| 5,697,760 A * | 12/1997 | Rosen | 414/789.7 |
| 6,364,027 B1 * | 4/2002 | Tvetene et al. | 172/19 |
| 6,527,502 B2 * | 3/2003 | Leijenaar | 414/792 |
| 6,659,189 B2 * | 12/2003 | Woerner et al. | 172/20 |

FOREIGN PATENT DOCUMENTS

| | | |
|---|---|---|
| EP | 1116429 A1 | 7/2001 |
| WO | WO 95/35021 | 12/1995 |

* cited by examiner

Primary Examiner—James R. Bidwell
(74) Attorney, Agent, or Firm—Jacobson & Johnson

(57) ABSTRACT

A towable sod stacker having a pallet holder for holding a stack of sod, a conveyor for receiving and temporarily storing a plurality of cut sod slabs and a sod pickup mechanism for lifting the plurality of cut sod sections from the conveyor and vertically placing the sod slabs in any of four positions on the pallet to provide an alternately stacked pallet of sod slabs with the towable stacker conveyor laterally displaceable to permit an operator to on-the-go dump a spoiled sod slab from the conveyor.

23 Claims, 4 Drawing Sheets

FIG. 7    FIG. 8    FIG. 9    FIG. 10
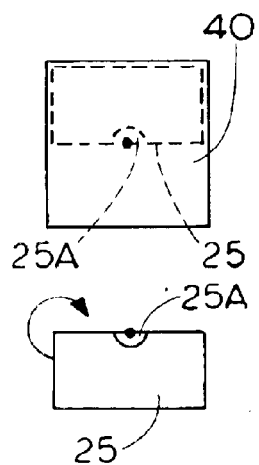
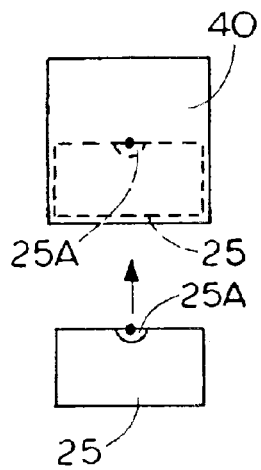
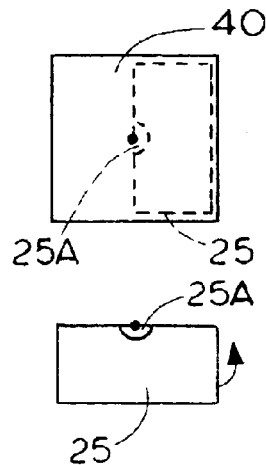
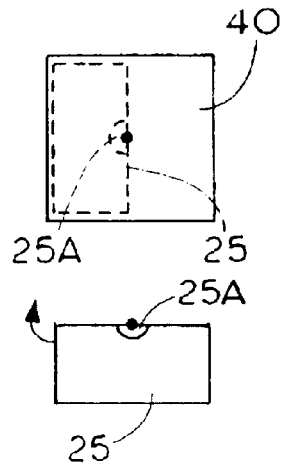
FIG. 11
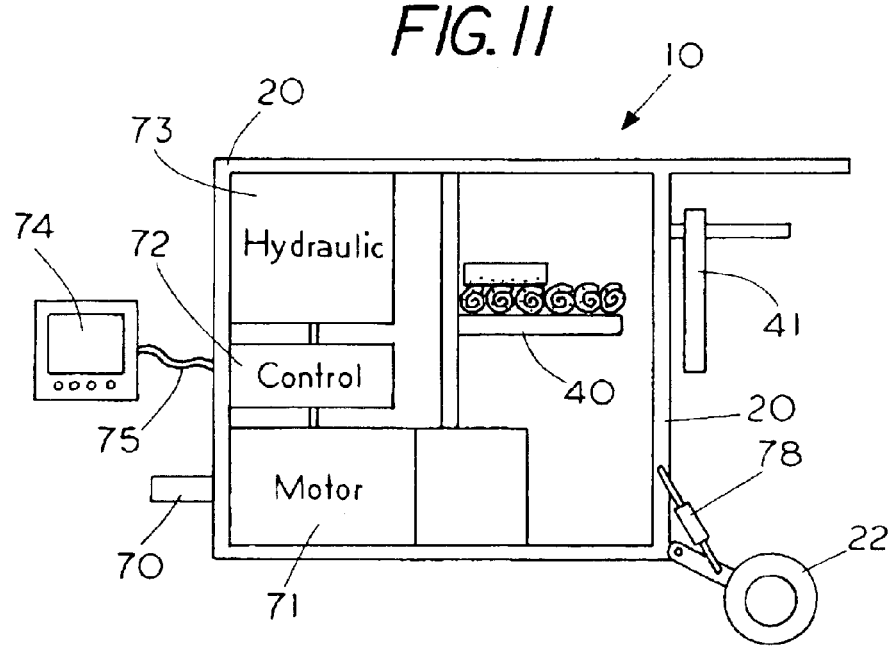

SOD STACKER

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

FIELD OF THE INVENTION

This invention relates generally to sod harvesting and, more specifically, to a sod stacker for on-the-go stacking of sod onto a pallet.

BACKGROUND OF THE INVENTION

The concept of sod harvesting is old in the art. Typically, a sod slab is cut free from a sod field. The slab is then rolled up into a cylindrical roll that is transferred to a pallet by a sod pickup mechanism. If the sod rolls are "small rolls", the sod rolls can be manually transferred to a sod delivery truck that delivers the sod to the area where the sod rolls are to be laid. If the sod rolls are "big rolls", it is necessary to use equipment to both lift and transfer the sod rolls.

Numerous devices are available for mechanizing portions of the sod harvesting and delivering process. For example, Schouten U.S. Pat. No. 5,230,602 shows a sod roll stacker for stacking rows of small rolls where the sod rolls are pushed onto a pallet. In order to alternate the rows the pallet with the sod rolls is rotated 90 degrees and the sod rolls are pushed on top of the existing rolls.

In contrast to the prior art Schouten method and apparatus for stacking sod the present invention allows one to lift and stack the sod rolls on a pallet without having to rotate the pallet or push the sod rolls onto the pallet thus lessening chances of damaging the sod roll.

In addition to the lessening the chances of damaging the sod roll during loading the pallet the present invention permits an operator to on-the-go dump a spoiled sod roll before it is stacked on the pallet.

SUMMARY OF THE INVENTION

A towable sod stacker having a pallet holder for holding a stack of sod slabs, a conveyor for receiving and temporarily storing a plurality of cut sod slabs and a sod pickup mechanism for lifting the plurality of cut sod slabs from the conveyor and vertically placing the sod slabs in any of four positions on the pallet to provide an alternately stacked pallet of sod slabs with the towable stacker conveyor laterally displaceable to permit an operator to on-the-go dump a spoiled sod slab from the stacker.

BRIEF DESCRIPTION OF THE DRAWINGS

FIG. 7 is a schematic view showing the sod pickup mechanism in the pickup position and the sod pickup mechanism in one of the four place positions;

FIG. 8 is a schematic view showing the sod pickup mechanism in the pickup position and the sod pickup mechanism in a second of the four place positions;

FIG. 9 is a schematic view showing the sod pickup mechanism in the pickup position and the sod pickup mechanism in a third of the four place positions;

FIG. 10 is a schematic view showing the sod pickup mechanism in the pickup position and the sod pickup mechanism in a fourth of the four place positions;

FIG. 11 is a side view of the towable stacker in a mode for attachment to a sod rolling device.

DESCRIPTION OF THE PREFERRED EMBODIMENT

Figure 1:
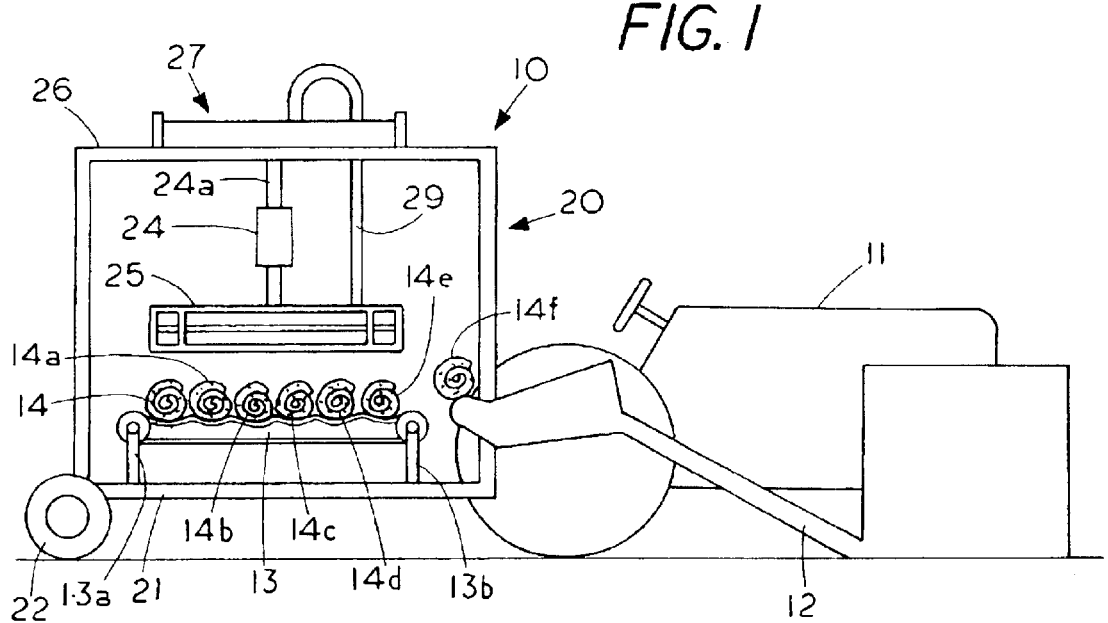
FIG. 1 is a side view of the sod stacker being towed by a tractor with the sod receiving conveyor in a loaded condition.

FIG. 1 is a side view of towable sod stacker 10 attached to the rear of a tractor 11. Tractor 11 has a conventional sod cutting and rolling mechanism 12 mounted laterally thereof. Sod stacker 10 comprises a box-like skeleton frame 20 having a lower member 21 engaging a set of wheels 22. A belt conveyor 13, is shown supported rearward of the sod cutting and rolling mechanism 12. Conveyor 13 comprises a receiver for receiving the sod rolls as sod rolls are delivered from the sod cutting and rolling mechanism 12. Conveyor 13, which has slack regions for holding a roll of sod, is more fully shown and described in our U.S. Pat. Nos. 6,364,027 and 6,296,063, which are incorporated by reference.

Located above conveyor 13 is the sod engagement mechanism or sod pickup mechanism 25 which includes a plurality of retractable spikes that pierce and engage the sod rolls to enable the sod engagement mechanism to lift the sod free of the conveyor 13. The sod pickup mechanism 25 with the retractable spike is also more fully shown and described in our U.S. Pat. Nos. 6,364,027 and 6,296,063 and is hereby incorporated by reference.

A feature of the present invention is that the stacker can be used with any of a different types of sod harvesting machines to provide on-the-go stacking by merely attaching the sod stacker 10 to a tractor through a three point hitch on the tractor or if desired a direct frame mount to the tractor. The towable stacker 10 can be supplied with either its own power source or can be driven off the power take off of the tractor. A further feature of the invention is the ability of an operator to "kick out" spoiled sod rolls while "on-the-go".

Attached to top frame member 26 of frame 20 is a sod transport mechanism 27 that transports sod rolls from the conveyor 13 on one side of the sod stacker to a pallet on the other side of the sod stacker. A power cylinder 24 is positioned between sod pickup mechanism 25 and the sod transport mechanism 27. The power cylinder 27, which has vertically contractible or extendible arm 24a allows one raise or lower the sod pickup mechanism 25 with respect to sod transport mechanism 27. This feature allows one to vertically position the sod pickup mechanism 25 in top surface engagement with the plurality of sod rolls 14, 14a, 14b, 14c, 14d and 14e located on belt conveyor 13. Once the tines or spikes of the sod engaging mechanism are in engagement with the sod rolls one can lift the sod rolls vertically off the conveyor 13 through retraction of arm 24a of power cylinder 24. A flexible cable 29 permits power to be supplied to the sod pickup mechanism 25 as the sod pickup mechanism is moved vertically upward or downward with respect to sod transport mechanism 27 while maintaining power thereto.

As shown in FIG. 1 conveyor 13 is supported by members 13a and 13b which are slidingly mounted on frame 20 to permit forward or rearward displacement of conveyor 13. FIG. 1 shows the conveyor 13 in the normal forward receiving mode. A power cylinder (not shown) connects to members 13a and 13b to slide conveyor 13 from a forward condition as shown in FIG. 1 to the rearward condition as shown in FIG. 2.

Figure 2:
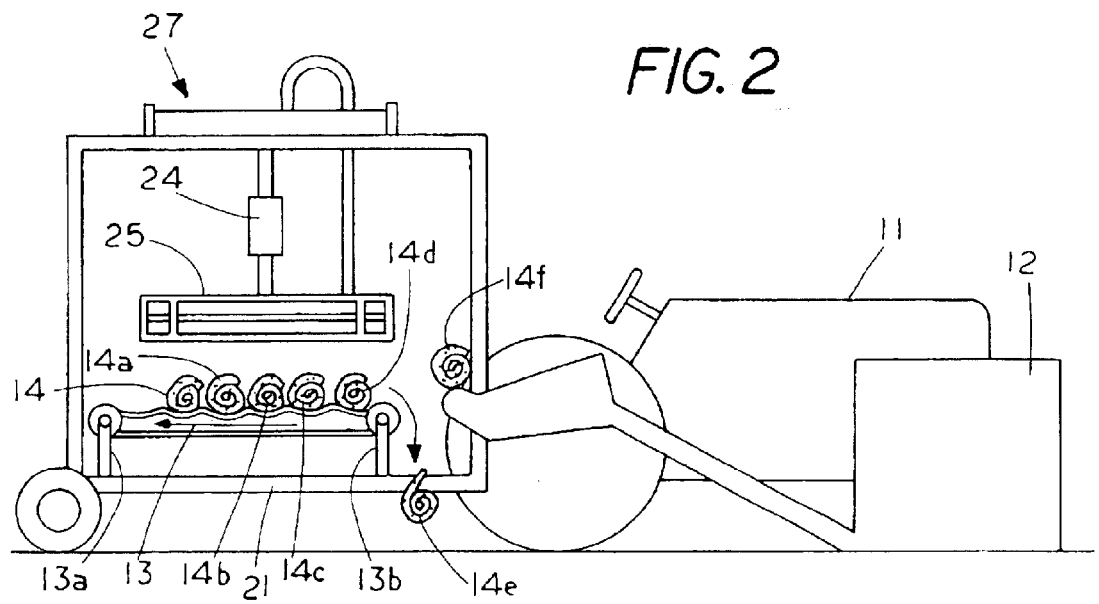
FIG. 2 is a side view of the sod stacker of FIG. 1 showing a spoiled roll of sod being dumped on the ground.

FIG. 2 is a side view of the stacker showing the conveyor 13 in the rearward condition to illustrate how a spoiled roll of sod 14e is dumped on the ground. That is, from time to time during the sod harvesting process a sod roll will be spoiled, possibly from some imperfections in the sod that is cut or possible because the sod is damaged during harvesting process which leaves the sod in an unusable or "spoiled" condition. With the present invention a "spoiled" sod roll can be dumped from the stacker while on-the-go so as not to be needlessly carried to the work site and then discarded. In order to dump the sod roll on the ground a power cylinder (not shown) allows one to move conveyor 13 backward from the sod pickup mechanism 12 (as shown in FIG. 1) to the sod drop position as (shown in FIG. 2). A sod roll can be dumped either of two ways, if the operator notes a spoiled sod roll 14f is coming through the sod roll mechanism 12 the operator displaces conveyor 13 rearward to allow sod roll 14f to fall on the ground. A second way, which is illustrated with sod roll 14e in FIG. 2, is to allow the sod roll 14e to first fall onto the conveyor 13. The operator can then displace the conveyor 13 rearward and at the same time rotate the conveyor clockwise to dump the sod roll 14e from the conveyor 14. Once the spoiled sod roll is dumped the conveyor 13 is moved into the position to receive further rolls of sod from the sod roll mechanism 12. Thus a feature of the present invention is that it allows an on-the-go removable of a "spoiled" sod roll from the system before the sod rolls are stacked on the pallet.

Figure 3:
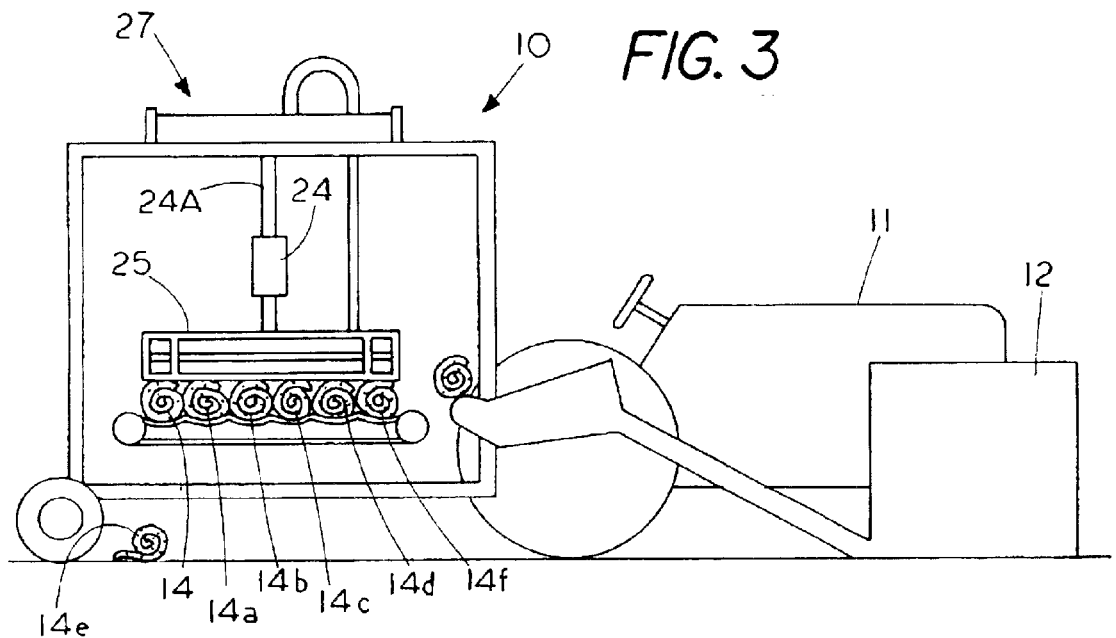
FIG. 3 is a side view of the sod stacker of FIG. 1 with the sod pickup mechanism in the sod pick up position on top of a plurality of sod rolls.

FIG. 3 is a side view of the sod stacker 10 showing the sod pickup mechanism 25 in the sod pick up position on top of a plurality of sod rolls 14, 14a, 14b, 14c, 14d and 14f which are carried by conveyor 13. In this condition the sod pickup mechanism 25 is in pressure contact with the top portion of each of the rolls to enable the retractable spikes (not shown) therein to engage the sod rolls so the sod rolls as a unit can be lifted free of the conveyor 13.

Figure 4:
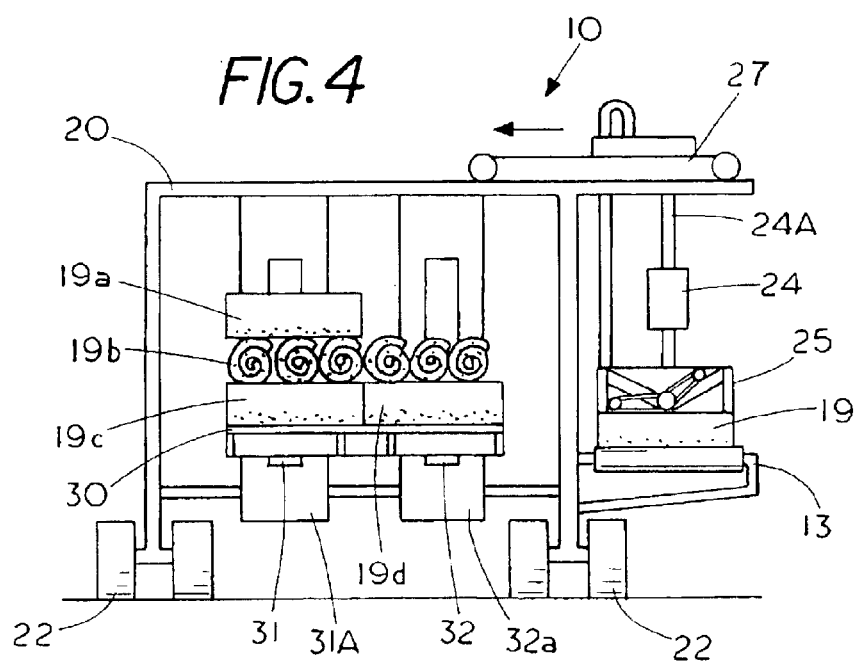
FIG. 4 is a rear view of the sod stacker of FIG. 1 showing the sod pickup mechanism on top of a plurality of rolls of sod and a further plurality of sod rolls stacked on a pallet carried by the sod stacker.

FIG. 4 is a rear view of the sod stacker 10 of FIG. 1 showing the sod pickup mechanism 25 on tope of a row of rolls of sod 19 and a further row of sod rolls 19a, 19b 19c and 19d which are stacked on a pallet 30 carried by the sod stacker 10. Pallet 30 is supported by L-shaped arms 31 and 32 which are slidingly mounted respectively in housing 31a and 32a. In operation, the arms 31 and 32 can be raised or lowered to position the pallet 30 at the proper height for receiving a row of sod rolls from the sod pickup mechanism 25. When the pallet 30 is fully loaded the arms are lower until the bottom of the pallet is supported by the soil which allows the arms 31 and 32 to slide free of the pallet 30 thus depositing the pallet of sod rolls on the field for pickup and removal to the work site. Thus it can be seen in FIG. 4 that the sod transport mechanism 27 which is shown positioned over sod rolls 19 can transport the sod rolls 19 to the pallet by moving lateral across frame 20.

Figure 5:
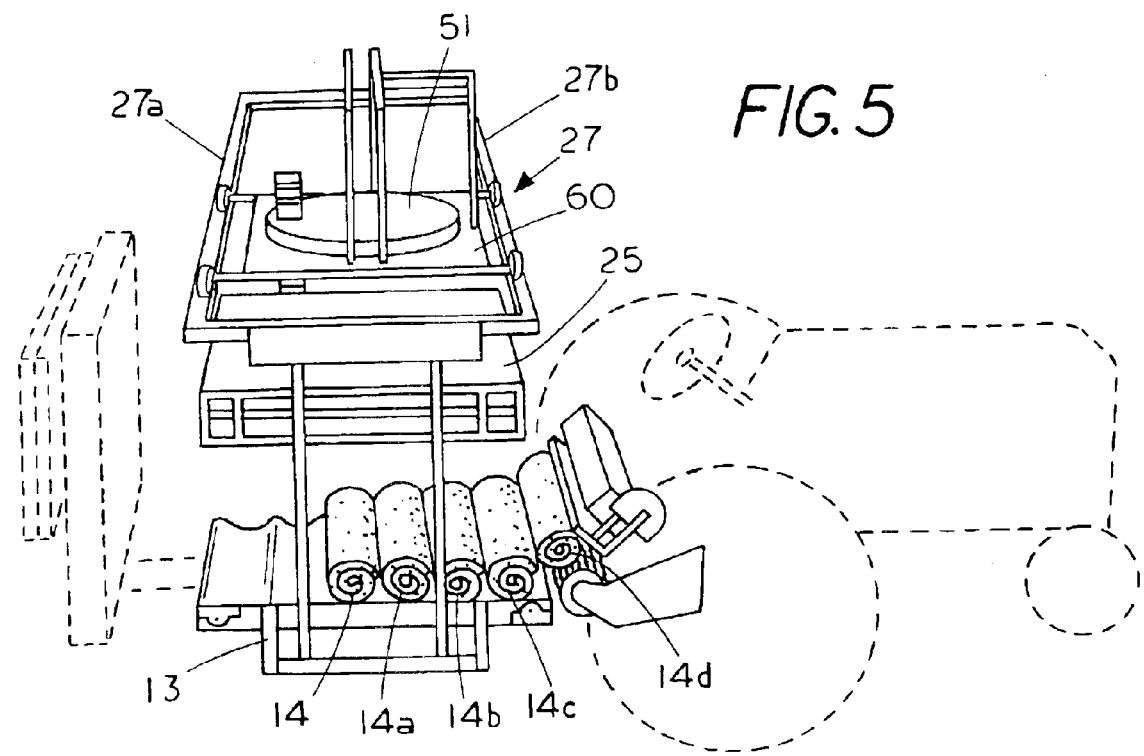
FIG. 5 is a partial pictorial view showing the sod conveyer, the sod pickup mechanism, and sod transport mechanism.

FIG. 5 is a partial pictorial isolated view showing the sod conveyer 13, the sod pickup mechanism 25, the sod transport mechanism 27 which is supported on a set of tracks 27a and 27b. For purposes of clarity frame 20 is not shown in FIG. 5 and the tractor and frame for holding extra pallets are shown in dashed lines. As can be seen in FIG. 5 the sod rolls 14, 14a, 14b, 14c and 14d are being delivered to conveyor 13 which moves them into position beneath sod pickup mechanism 25. Located in sod transport mechanism 27 is a traveling carriage 60 having a rotatable head 51 mounted therein. In operation of the sod transport mechanism the traveling carriage 60 can move from front to back along tracks 27a and 27b. In addition the rotation of head 51 permits positioning the sod engagement mechanism 25 at various position to provide a compound motion transportation of a row of sod rolls. That is by rotating head 51 it permits one to move the rows of sod from one side of the stacker to the opposite side to permit the stacking of the sod rolls on a pallet. This feature of stacking sod rolls in different positions on the pallet 20 is illustrated in FIG. 4.

Figure 6:
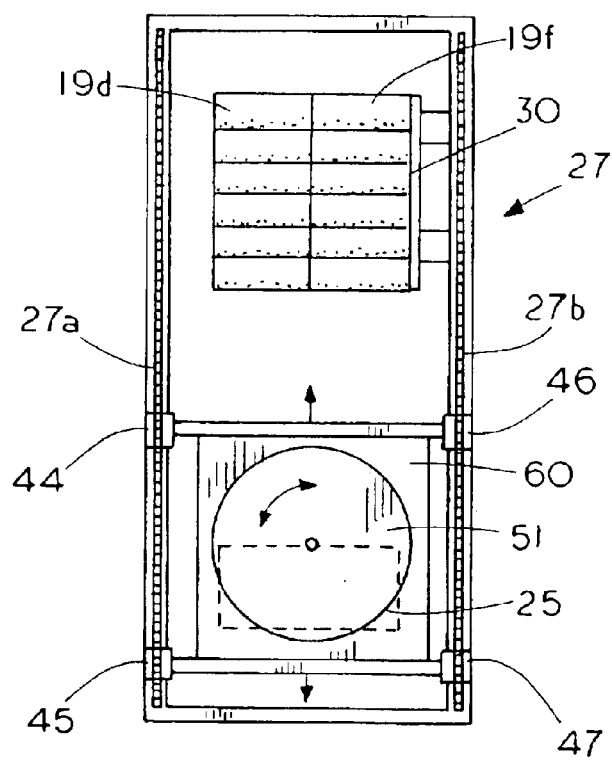
FIG. 6 is a top view of the a sod pickup mechanism and sod transport mechanism for lifting the plurality of cut sod rolls from the conveyor and vertically placing the sod rolls in any of four positions on the pallet to provide an alternately stacked pallet.

To further illustrate the sod transport mechanism 27 reference should be made to FIG. 6 which shows a top isolated view showing the sod transport mechanism 27 that is carried on frame 20. Located in a parallel relation is a first track 27a which engages sprocket wheels 44 and 45 and a second track 27b which engages sprocket wheels 46 and 47. A driver (not shown) rotates the shaft carrying the sprocket wheels to cause the traveling carriage 60 to move from the front pickup position (shown in FIG. 6) to a rear place position above pallet 30. That is, the traveling carriage provides lateral movement of the sod rolls from the conveyor 13 to the pallet 30. The traveling carriage 60 is shown having a rotatable head 51 located thereon. Rotatable head 51 is rotated from the sod pick-up position shown in FIG. 6 to each of the sod delivery or place positions shown in FIGS. 7–10. The pallet 30 is shown positioned between rails 27a and 27b so that when the traveling carriage 60 moves rearward the sod rolls carried by the sod roll pickup mechanism 25 can be vertically lowered onto the pallet 30.

In order to appreciate the compound action of the sod transport mechanism 27 reference should be made to FIGS. 7–10. FIG. 7 is a schematic view showing the sod pickup mechanism 25 in the sod pickup position(solid lines) and the sod pickup mechanism 25 in one of the four place positions (dashed lines) above pallet 40. The sod pickup mechanism 25 is shown in dotted lines with reference to an offset pivotal support member 25a. In the position shown in FIG. 7 the sod is picked up from the conveyor 13 (i.e. the pick up position) and the sod pickup mechanism 25 then is rotated 180 degrees to position the rolls of sod above a first rear portion of pallet 40. This is one of the four place positions of the sod pickup mechanism.

FIG. 8 is a schematic view showing the sod pickup mechanism 25 also in the pickup position(solid lines) and the sod pickup mechanism in a second of the four place positions (dashed lines). In the position shown in FIG. 8 the sod pickup mechanism 25 has not been rotated while the pickup mechanism is positioned above a second front portion of the pallet 40. As evident from the views in FIG. 7 and FIG. 8 one can stack the sod on both the front and back halves of the pallet 40 through the coaction of both the translation action of traveling carriage 60 and the rotational positioning of the offset connector 25a on sod engagement mechanism 25. Thus one could form a first layer of sod rolls on the pallet 40 through the combined rotational positioning of head 51 and the translation movement of traveling carriage 60.

FIG. 9 is a schematic view showing the sod pickup mechanism 25 in the pickup position(solid lines) and the sod pickup mechanism 25 in a third of the four place positions (dashed lines). In the position shown, the sod pickup mechanism 25 has been rotated 90 degrees clockwise to permit the positioning a row of sod rolls crosswise to the rolls of sod on a first layer. In this place position the sod rolls are placed on the right half of the pallet 40.

FIG. 10 is a schematic view showing the sod pickup mechanism 25 in the pickup position(solid lines) and the sod pickup mechanism 25 (dashed lines)in a fourth of the four place positions. In the place position the sod pickup mechanism 25 has been rotated counter clockwise 90 degrees so that when the sod rolls are rotated they will occupy the left half of the pallet 40.

As is evident form FIGS. 7 to 10 the operator can use the off set positioning of connector 25a on sod pickup mechanism 25 to permit positioning the sod rolls in any of a number of different positions above pallet 40. As a result a sod pickup mechanism that moves laterally, which by itself would not be able to stack side by side rows on the pallet, can be combined with the rotatable head 51 on the sod pickup mechanism 25 to enable the positioning of the sod rolls on any of the four positions shown in FIGS. 7–10 thus enabling one to stack the sod rolls in different positions on a pallet.

Thus the present invention includes a method of on-the-go stacking of cut slabs of sod received from a sod harvester comprising receiving a first cut slab of sod engaging the first cut slab of sod with a sod pickup mechanism, transporting the first cut slab of sod to a pallet by laterally displacing the sod pick up mechanism, placing the first cut slab of sod in a first position on the pallet, receiving a second cut slab of sod, engaging the second cut slab of sod with the sod pickup mechanism, transporting the second cut slab of sod to the pallet by lateral and rotationally displacing the sod pickup mechanism and depositing the second cut slab of sod on the pallet to form a stack of sod slabs.

While the invention is described in relation to plurality of rolls of sod the invention is also suitable for use in stacking sod in unrolled slabs since the slabs can be positioned on the pallet in the same manner as the rolls.

Referring to FIG. 11 there is shown an opposite side view of stacker 10 in the unmounted condition with hitch 70 extending outward from frame 20. Hitch 70 can be a typical three point tractor hitch or can be part of a tractor frame attachment. Located on stacker 10 is a motor 71 for powering the stacker 10 thought a set of controls 72 and a source of hydraulic pressure for powering the various components of the stacker. A monitor 74 with on tractor controls connects to control box 72 through flexible cable 75 to allow the operator to position the monitor in a convenient location on the tractor. While the embodiment shown in FIG. 11 includes a motor 71 to provide power to stacker 10, in some instances, the available power from the tractor PTO or hydraulic system can be used to power the stacker.

FIG. 11 shows the use of power cylinders 78 to connect frame 20 to wheels 32 to permit the stacker to follow over uneven fields. An extra sod pallet 40 is shown hanging on frame 20 in a position to be placed on the pallet holder when pallet 40 is dropped for pickup.

We claim:

1. A towable sod stacker comprising:
   a frame;
   a hitch on said frame for towing said sod stacker in a sod roll receiving condition;
   a conveyor for receiving and holding a first plurality of sod rolls said conveyor displaceable to permit discharging an unwanted sod roll from said sod stacker;
   a pallet holder carried by said frame, said pallet holder spaced from said conveyor; and
   a sod roll transport mechanism for engaging and transporting the first plurality of sod rolls from said conveyor and then stacking the first plurality of sod rolls in a first position on said pallet holder and for transporting a second plurality of sod rolls from said conveyor and stacking the second plurality of sod rolls proximate the first plurality of sod rolls.

2. The towable sod stacker of claim 1 including a set of wheels for supporting said frame.

3. The towable sod stacker of claim 1 including a motor mounted on said frame for powering said sod roll transport mechanism.

4. The towable sod stacker of claim 1 wherein said sod roll transport mechanism includes a traveling carriage, displaceable mounted on said frame.

5. The towable sod stacker of claim 4 wherein said traveling carriage includes a rotatable head.

6. The towable sod stacker of claim 5 wherein the sod roll transport mechanism includes:
   a sod roll pick up mechanism, said sod roll mechanism carried by said traveling carriage, said sod roll pickup mechanism vertically displaceable with respect to said carriage to allow the sod roll pick up mechanism to engage and lift a row of sod rolls from said conveyor to laterally transport the row of sod rolls to the pallet holder.

7. The towable sod stacker of claim 2 wherein said conveyor is rotatable to transport a sod roll in a rearward direction along said conveyor.

8. The towable sod stacker of claim 1 wherein the pallet holder is vertically displaceable to permit lowering a pallet of sod onto a field for pickup.

9. A method of on-the-go stacking of cut slabs of sod received from a sod harvester comprising:
   displacing a conveyor to allow a spoiled slab of sod to be discharged from the on-the-go stacking of cut slabs of sod;
   receiving a first cut slab of sod;
   engaging the first cut slab of sod with a sod pickup mechanism;
   transporting the first cut slab of sod to a pallet by laterally displacing the sod pick up mechanism;
   placing the first cut slab of sod in a first position on the pallet;
   receiving a second cut slab of sod;
   engaging the second cut slab of sod with the sod pickup mechanism;
   transporting the second cut slab of sod to the pallet by lateral and rotationally displacing the sod pickup mechanism; and
   depositing the second cut slab of sod on the pallet to form a slack of sod slabs.

10. The method of claim 9 wherein the first cut slab of sod is formed into a first roll of sod and the second cut slab of sod is formed into a second roll of sod.

11. The method of claim 9 wherein the first cut slab of sod is received by a conveyor.

12. The method of claim 9 including the step of stacking at least three layers of sod slabs on said pallet.

13. The method of claim 9 including the step of simultaneously rotating and displacing the second cut slab of sod as the second cut slab of sod is carried to the pallet.

14. The method of claim 9 including the step of vertically lifting the first cut slab of sod prior to transporting the first cut slab of sod to the pallet.

15. The method of claim 9 including the step of allowing a spoiled cut slab of sod to fall free.

16. The method of claim 9 including the step of vertically lifting the first cut slab of sod prior to transporting the first cut slab of sod to the pallet.

17. The method of claim 9 including the step of stacking cut slabs of sods on the pallet by lifting the cut slabs of sod and transporting the cut slabs of sod to the pallet by laterally and rotationally displacement of the cut slabs of sod.

18. A sod stacker comprising:
   a frame;
   a sod cutting mechanism; and
   a conveyor for receiving and holding a cut slab of sod from the sod cutting mechanism with said conveyor and said sod cutting mechanism spaceable from each other to allow a spoiled slab of sod to be discharged from the sod stacker without being stacked.

19. The sod stacker of claim 18 including:
   a pallet holder carried by said frame, said pallet holder spaced from said conveyor; and
   a sod slab transport mechanism for engaging and transporting a first plurality of sod slabs from said conveyor and then stacking the tint plurality of sod slabs in a first position on a pallet on said pallet holder and for transporting a second plurality of sod slabs from said conveyor and stacking the second plurality of sod slabs proximate the first plurality of sod slabs.

20. The sod stacker of claim 18 including a power cylinder for sliding the conveyor away from the sod cutting mechanism to allow an operator to eject the spoiled slab of sod from the sod stacker while on-the-go.

21. The sod stacker of claim 18 wherein the conveyor receives the spoiled slab of sod and the conveyor is rotated to discharge the spoiled slab of sod from the sod stacker.

22. The sod stacker of claim 18 wherein the sod cutting mechanism discharges the spoiled slab of sod and the spoiled slab of sod is allowed to fall without being engaged by the conveyor.

23. The sod stacker of claim 18 wherein the sod cutting mechanism includes a sod roller.

\* \* \* \* \*

UNITED STATES PATENT AND TRADEMARK OFFICE
CERTIFICATE OF CORRECTION

PATENT NO.     : 6,783,318 B2
DATED          : August 31, 2004
INVENTOR(S)    : Theodore Tevetene et al.

It is certified that error appears in the above-identified patent and that said Letters Patent is hereby corrected as shown below:

Column 7,
Line 16, should read:
-- 16. The method of 15 including the step of vertically lifting the first cut slab of sod prior to transporting the first slab of sod to the pallet.

Column 8,
Line 3, should read:
-- 19. The sod stacker of claim 18 including:
   A pallet holder carried by said frame, said pallet holder spaced from said
Conveyor; and
   A sod slab transport mechanism for engaging and transporting a first plurality of sod slabs from said conveyor and then stacking the "tint" -- first -- plurality of sod slabs in a first position on a pallet on said pallet holder and for transporting a second plurality of sod slabs from said conveyor and stacking the second plurality of sod slabs proximate the first plurality of sod slabs.--

Signed and Sealed this

Thirty-first Day of May, 2005

JON W. DUDAS
*Director of the United States Patent and Trademark Office*